United States Patent
Battaglia

(10) Patent No.: US 11,030,084 B2
(45) Date of Patent: Jun. 8, 2021

(54) API SPECIFICATION PARSING AT A MOCKING SERVER

(71) Applicant: salesforce.com, inc., San Francisco, CA (US)

(72) Inventor: Martin Battaglia, Pilar (AR)

(73) Assignee: salesforce.com, Inc., San Francisco, CA (US)

( * ) Notice: Subject to any disclaimer, the term of this patent is extended or adjusted under 35 U.S.C. 154(b) by 181 days.

(21) Appl. No.: 16/252,241

(22) Filed: Jan. 18, 2019

(65) Prior Publication Data
US 2020/0233787 A1 Jul. 23, 2020

(51) Int. Cl.
*G06F 11/00* (2006.01)
*G06F 11/36* (2006.01)
*H04L 29/06* (2006.01)
*G06F 9/54* (2006.01)
*H04L 29/08* (2006.01)

(52) U.S. Cl.
CPC .......... *G06F 11/3688* (2013.01); *G06F 9/547* (2013.01); *G06F 11/3664* (2013.01); *H04L 63/0876* (2013.01); *H04L 63/105* (2013.01); *H04L 67/1097* (2013.01)

(58) Field of Classification Search
CPC ............. G06F 11/3688; G06F 11/3616; G06F 11/263; G06F 11/3664
See application file for complete search history.

(56) References Cited

U.S. PATENT DOCUMENTS

| 10,089,219 B1 * | 10/2018 | Bates | G06F 9/451 |
| 10,437,712 B1 * | 10/2019 | Tyler | G06F 11/3684 |
| 2018/0357154 A1 * | 12/2018 | Dolby | G06F 11/3684 |

OTHER PUBLICATIONS

Google Scholar/Patents—text refined (Year: 2021).*

* cited by examiner

*Primary Examiner* — Christopher S McCarthy
(74) *Attorney, Agent, or Firm* — Holland & Hart LLP

(57) ABSTRACT

A system may include a mocking server and one or more tenants served by the mocking server. A tenant may test an application programming interface (API) by creating a mock implementation of the API using a mocking service provided by the mocking server. The mocking server may generate a mock implementation of the API based on an API specification and expose an endpoint of the mock implementation for the user to perform testing. The user may provide an identifier for an API specification to the mocking server. The mocking server may retrieve the API specification from a source, parse the API specification in memory to create a mock model of the API, and generate a mock implementation for the API from the mock model. The mocking server includes an authentication mechanism to ensure that users accessing the API specification or running a mock implementation of the API are authorized.

19 Claims, 12 Drawing Sheets

API SPECIFICATION PARSING AT A MOCKING SERVER

FIELD OF TECHNOLOGY

The present disclosure relates generally to database systems and data processing, and more specifically to application programming interface (API) specification parsing at a mocking server.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A server may host a mocking service for testing and validating an application programming interface (API). The mocking service may generate a mock implementation for the API based on an API specification, which details features, processes, and functions of the API. By using an exposed endpoint of the mock implementation, a user can test functionality of the API per the API specification. In some cases, this endpoint may be accessible to any user inputting the correct uniform resource locator (URL) corresponding to the mock implementation at the server. This may publicly expose the mock implementation, making it accessible for even unauthorized users. Publicly exposing the mock implementation may lead to a security risk if important information about an API or API specification is publicly exposed, especially if the API is not yet publicly released.

DETAILED DESCRIPTION

Figure 1:
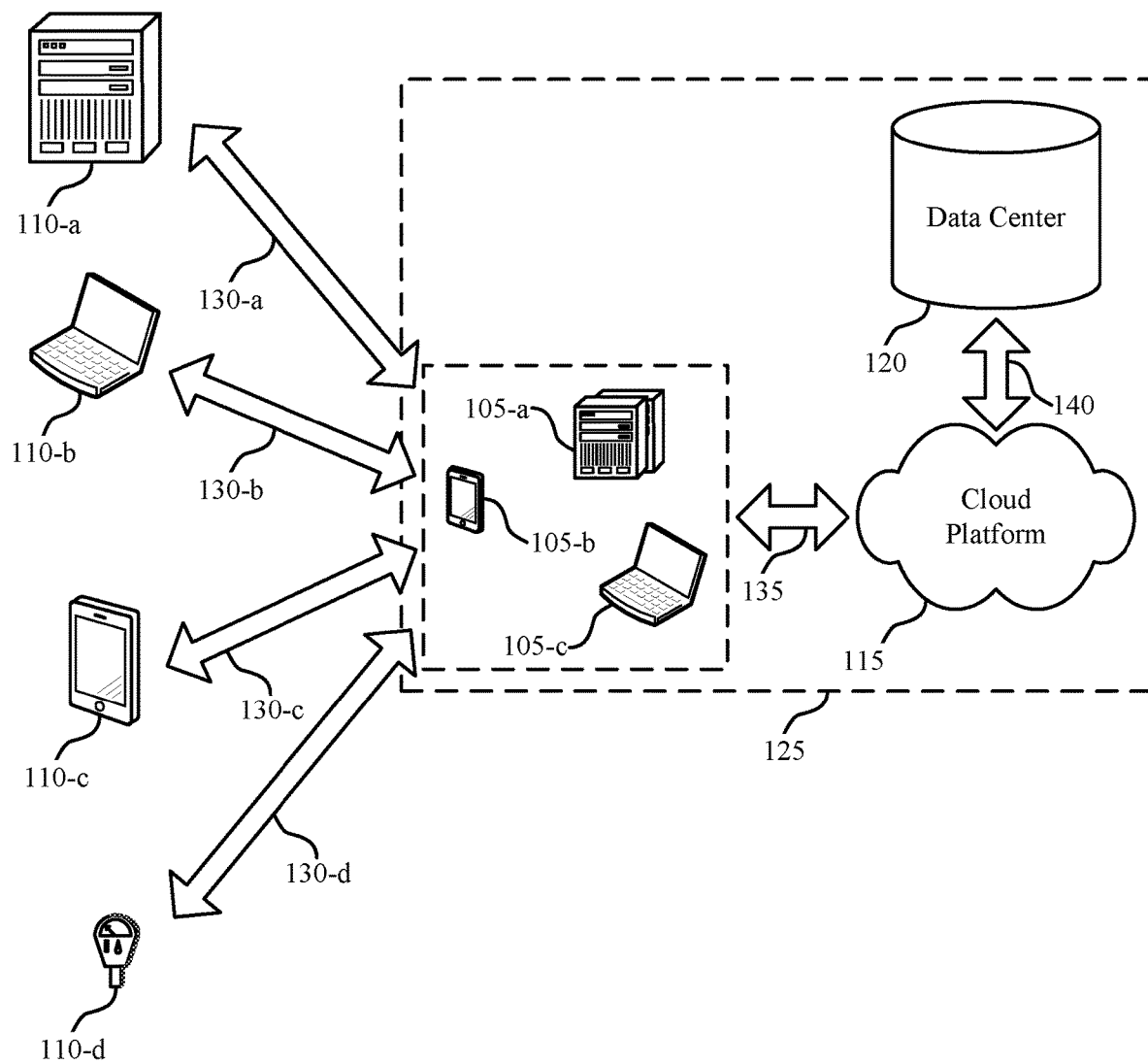
FIG. 1 illustrates an example of a system for testing an application programming interface (API) that supports API specification parsing at a mocking server in accordance with aspects of the present disclosure.

A system, such as a cloud-based system supporting customer relationship management (CRM) solutions, may support a server (e.g., a mocking server) which hosts an application programming interface (API) mocking service. The mocking service may support secure, efficient API testing and validating. The mocking service may expose an endpoint of the API to the user, which the user may use for testing the API prior to full implementation (e.g., publishing) of the API. The testing may be based on an API specification and its underlying metadata. An API specification may refer to a document or program that defines at least a portion of the functionality of an API (e.g., including any combination of behaviors, definitions, documentation, etc., for the API). The user may validate whether the API is functioning properly and troubleshoot any problems with the API based on results of the mocking service.

In some systems, a server hosting a mocking service (e.g., a mocking server) may generate a mock implementation of an API based on a parsed model of an API specification for the API. In these systems, the user may design the API specification using an API specification language in a web tool at a user device. In some cases, the web tool of these systems may provide a built-in parser that is specific to the API specification language, such that API specifications written in other languages cannot be parsed using the parser of the web tool. The user may provide the mocking server with the parsed model of the API specification, and the mocking server may generate a mock implementation for the API based on the parsed model. In some cases, the mocking server may be configured to create mock implementations based on pre-parsed models and may not perform parsing internally at the server. In other cases, the mocking server may be configured to create mock implementations based on a single API specification language, and the mocking server of these systems may be restricted from creating a mock implementation based on a different API specification language. Supporting a specific API specification language may limit the accessibility of the mocking service to users who have access to tools which use that specific API specification language. Further, by using a pre-parsed model as input at the mocking server, users may need to parse API specifications prior to utilizing the mocking service. As such, users without access to a specific API specification parser may be unable to use the mocking service. These systems may also pose security risks, as when the mocking service is switched on, the specification uniform resource locator (URL) may be modified. The mocking server of these systems may replace the specification URL with a mocking endpoint (e.g., a URL associated with a mock implementation of the API specification). These systems may not provide an authentication procedure when a user accesses the mock instances, so these exposed mocking endpoints may be accessible by anyone with the correct identifier (e.g., URL associated with the mock implementation) for the mocking endpoint.

To enhance functionality and accessibility of the mocking service, the mocking server may handle API specifications directly and parse the API specifications in memory at the mocking server. By moving the parsing procedure from an external web tool to inside memory at the mocking server, a user may provide an API specification of an API, not a parsed model, and the mocking server may handle generation of a mock implementation for the API based on the API specification. This may enable the mocking server to implement a universal parser, such that the mocking server is not limited to handling API specifications written in one or more specific languages. Further, the user may be able to provide an identifier for the API specification, and the mocking server may retrieve the API specification from a source which stores the API specification. For example, the API specification may be stored at an internal repository to the mocking server, an external repository to the mocking server, a shared code repository, etc. The mocking server may then handle parsing the API specification to produce a parsed model, generating a mock implementation from the parsed model, and running, by request of the user, the mock implementation in memory at the mocking server. The user may test functionality of the API by interacting with the mock implementation of the API, which may be displayed on a user interface at a user device operated by the user.

Moving the parser to server-side responsibilities may provide enhanced security for running mock implementations of APIs. For example, the mocking server may provide an authentication mechanism, which may limit execution of a mock implementation to authorized users. The mocking server may reject requests to run the mock implementation from unauthorized users. Thus, by providing the authentication mechanism, only authorized users or applications may have access to a specific mock according to permissions of the users or applications (e.g., permissions to access the source of the API specification). A user with the right authentication credentials may create a shareable link to the mock implementation, such that any user with the link can access the exposed endpoint. The link may be configured with an expiration time, such that any requests to run the mock implementation after the link has expired will fail. Further, the mocking server may be configured to retrieve API specifications from sources based on a permissions level of a user accessing the source. If a user requests to retrieve an API specification from a source, but the user does not have sufficient permissions or authorization with that source, the request may be rejected, which may improve security for the API specifications stored at the source.

Aspects of the disclosure are initially described in the context of an environment supporting an on-demand database service. Aspects of the disclosure are further illustrated by and described with reference to apparatus diagrams, system diagrams, and flowcharts that relate to API specification parsing at a mocking server.

FIG. 1 illustrates an example of a system 100 for testing an API that supports API specification parsing at a mocking server in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may include a server, such as a mocking server, which hosts an API mocking service. In some cases, the server may include aspects of an application server as described herein. The mocking service may support secure, efficient API testing and validating. The mocking service may expose an endpoint of the API to a user, which may be an example of a cloud client 105 or a contact 110. The user may be an example of a tenant of the mocking server. The user may use the endpoint to test the API prior to full implementation (e.g., publishing) of the API. The testing may be based on an API specification and its underlying metadata. An API specification may refer to a document or program that defines at least a portion of the functionality of an API (e.g., including any combination of behaviors, definitions, documentation, etc., for the API). The user may validate whether the API is functioning properly and troubleshoot any problems with the API based on results of the mocking service.

In some conventional systems, a server hosting a mocking service may generate a mock implementation of the API based on a pre-parsed model of the API specification (e.g., where "pre-parsed" refers to a model parsed prior to reception at the server). To test an API, a user may provide the server with a parsed model of an API specification for the API. The user may design the API specification using an API specification language at a user device (e.g., in an API design tool, such as a web tool). In some cases, the API design tool of these systems may provide a built-in parser that is specific to one or more API specification languages, such that API specifications written in other languages cannot be parsed using the parser of the API design tool. In some cases, the mocking server may similarly be restricted to creating mock implementations based on the same API specification language, and the mocking server of these systems may be unable to create a mock implementation for an API specification based on a different API specification language. Supporting only specific API specification languages may limit the accessibility of the mocking service to users who have access to tools which use that API specification language. Further, by requiring the user to parse the API specification and provide a parsed model to the server, users who do not have access to an API specification parser may be unable to utilize the mocking service.

Additionally or alternatively, conventional systems may pose security risks when creating mock implementations (e.g., mock instances) of an API. When the mocking service in these conventional systems is switched on, the specification URL may be modified, replacing it with a mock URL endpoint. These systems may not provide an authentication procedure when accessing the mock instances, so an exposed mock URL endpoint may be accessible by anyone with the correct identifier (e.g., URL) for the endpoint. If the conventional mocking service is used to test and validate an API prior to officially releasing the API, secure information related to the API may be publicly exposed. Thus, hostile users (e.g., competitors, hackers, etc.) may be able to identify information about the API or API specification prior to release or view private information that may be included for testing purposes.

To enhance functionality and accessibility of the mocking service in the system 100, the mocking server (e.g., a cloud client 105) may handle API specifications directly and parse the API specifications in memory at the mocking server. By moving the parsing procedure from an external tool to inside memory at the mocking server (e.g., corresponding to the cloud platform 115), a user may provide an API specification of an API, and the mocking server may handle generation of a mock implementation for the API based on the API specification. This may enable the mocking server to implement a universal parser, such that the mocking server is not restricted to handling API specifications written in specific languages. Further, as the parser is integrated as part of the mocking service, accurate mocking implementations may not be dependent on a user correctly parsing an API specification. Additionally, the system 100 may support a user providing an identifier for the API specification, and the mocking server may retrieve the API specification from a source which stores the API specification. Examples of the source may include an internal repository to the mocking server (e.g., in the cloud platform 115), an external repository to the mocking server (e.g., in a data center 120), a shared code repository, storage in a cloud client 105, storage in a contact 110, etc. This API specification retrieval process may support implementing user authentication when testing an API. The user may provide an identifier for the API specification, and the mocking server may retrieve the API specification from the source based on the identifier. The mocking server may then handle parsing the API specification to produce a parsed model, generating a mock implementation from the parsed model, and running, by request of the user, the mock implementation in memory at the mocking server. The user may then test functionality of the API by interacting with the mock implementation of the API, which may be displayed on a user interface at a user device operated by the user.

Implementing the parser as a server-side responsibility may provide enhanced security of the system 100 when running mock implementations of APIs. For example, the mocking server may provide an authentication mechanism which may allow only authorized users to execute a mock implementation. The mocking server may reject requests to run the mock implementation from unauthorized users. Thus, by providing the authentication mechanism, mocking services may support authorized users or applications accessing a specific mock, which may be based on the user's permissions to the source of the API specification. In some cases, a user with sufficient authentication credentials may create a shareable link to the mock implementation, such that any user with the link can access the exposed endpoint. The link may be configured with an expiration time, such that any requests to run the mock implementation after the link has expired will fail. Further, the mocking server may be configured to retrieve API specifications from sources based on a permissions level of a user with the source. If a user requests to retrieve an API specification from a source, but the user does not have sufficient permissions or authority with that source, the request may be rejected. These authentication mechanisms may improve security for the API specifications at the source, for the mock implementations at the server, or for both.

It should be appreciated by a person skilled in the art that one or more aspects of the disclosure may be implemented in a system 100 to additionally or alternatively solve other problems than those described above. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example, a developer may design an API specification for an API. The API may not yet be released, so the developer may test the API to check its functionality and verify whether the API is ready for publishing. The API specification may be stored in a shared code repository, which may be accessible via the Internet or a repository accessing service. The developer may use the mocking service described herein to generate a mock implementation of the API. The developer may use a user device (e.g., a cloud client 105) to interact with the mocking service via a user interface of the user device. The developer may provide an identifier for the API specification of the API to the mocking server. For example, the developer may provide a link to the API specification on the shared code repository. The mocking server may check the credentials of the developer with the source based on the identifier (or another authentication credential), determine the developer is allowed to access the source, and retrieve the API specification from the shared code repository. The mocking server may parse the API specification using a universal parser to create a parsed mock model of the API. This parsed mock model may be cached locally at the mocking server.

To run a mock instance of the API, the developer may send a request message (e.g., via the user interface of the user device) to the mocking service indicating a mock implementation of the API. The mocking server may then generate a mock implementation for the API based on the parsed mock model of the API. In some cases, the mocking server may again authenticate the developer to ensure that the developer has the proper credentials to access the mock implementation of the API. The mocking server may expose an endpoint of the mock implementation, and the developer may interact with the exposed endpoint (e.g., via the user interface of the user device) to test the functionality of the API.

Figure 2:
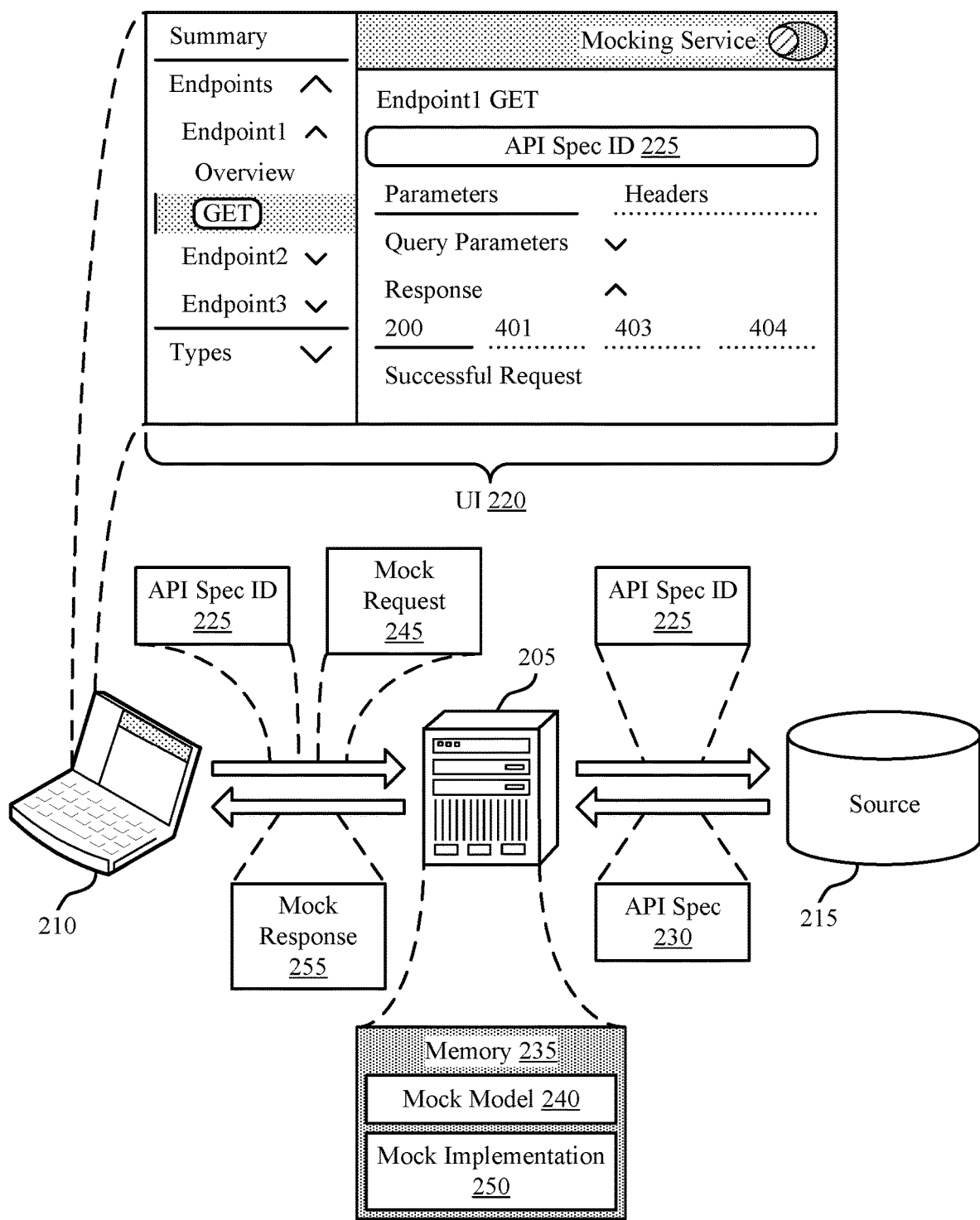
FIGS. 2 and 3 illustrate examples of mocking services that support API specification parsing at a mocking server in accordance with aspects of the present disclosure.

FIG. 2 illustrates an example of a mocking service 200 that supports API specification parsing at a mocking server in accordance with aspects of the present disclosure. The mocking service 200 may include a server 205, which may be an example of a mocking server or application server. This server 205 may be a single server, a server cluster, a container, a virtual machine, or any other device or system for running mock implementations 250 of API specifications 230. The server 205 may receive information from a user device 210 (e.g., via a user interface 220) to generate mock models 240 and execute mock implementations 250. Additionally, in some cases, the server 205 may retrieve API specifications 230 from one or more sources 215. A source 215 may be an example of an internal repository to the server 205 or a system served by the server 205, an external repository to the server 205, a shared code repository, a file upload, a database, a data store, a cloud-based storage entity, or some combination of these or other storage systems. In some cases, the server 205 or user device 210 may operate as the source 215 for an API specification 230.

The mocking service 200 may support secure, efficient API testing and validation. The mocking service user interface 220 may allow a user operating the user device 210 to simulate requests to an API in order to test that the API is functioning properly, troubleshoot problems, and/or to demo the API. For example, the mocking service 200 may expose an endpoint to a user—via the user interface 220—that the user may use for testing an API prior to full implementation (e.g., publishing) of the API. This testing may be based on an API specification 230 and its underlying metadata. An API specification 230, as described herein, may refer to any document or program that defines at least a portion of the functionality of an API (e.g., including any combination of behaviors, definitions, documentation, etc. for the API). The user may validate whether the API is functioning properly based on results of the mocking service 200.

In some cases, the mocking service 200 may be an extension of an API designer application (e.g., an API designer web tool). The API designer application may support a user creating new API specifications 230 and/or editing existing API specifications 230. For example, a user may design an API at the user device 210 in a web tool with a built-in parser. This parser may be specific to an API modeling language (e.g., representational state transfer (REST)ful API modeling language (RAML)) and may parse the user-defined API specification 230 to generate a mock model 240 for the API. The user device 210 may send this pre-parsed mock model 240 to the server 205, and the server 205 may store the mock model 240 in memory 235. To test the API specification 230, the user may input requests to the API in the mocking service user interface 220. If the mocking service 200 is turned on (e.g., a mocking service switch is toggled to indicate that the mocking service 200 is 'ON'), the server 205 may receive the mock request 245 and simulate the request using the pre-parsed mock model 240 in memory. This simulation may be referred to as a mock implementation 250 or mock instance. The server 205 may determine a mock response 255 based on the mock implementation and may return the mock response 255 to the user device 210. This response may be displayed in the user interface 220. For example, the mock response 255 may include one or more hypertext transfer protocol (HTTP) status codes (e.g., "200," "401," "403," and "404" as illustrated in FIG. 2), one or more error messages, or some combination of these responses. In this way, the mocking service 200 may simulate a real implementation of an API but may return a simulated (i.e., "mock") result.

In these cases where the mocking service 200 is built into an API designer tool, a user may validate an API specification 230 created or modified in the API designer tool using feedback from the mocking service 200. Based on the mock response 255 received from the server 205, the user may iterate on the design of the API specification 230, simulate the updated API, receive further feedback, and once more validate whether the API operates as desired. A user may loop through this procedure as many times as necessary within the API designer application prior to publishing the API to test the API specification 230 for errors or bugs. Once satisfied, the user may publish the API for reuse by a wider set of users (e.g., any users, users with specific licenses or authentication tokens, users with certain security credentials, etc.).

In other cases, the mocking service 200 may operate as a standalone service (e.g., independent of an API designer tool, as illustrated in FIG. 2). In these cases, the mocking service 200 may allow a user to input an API specification identifier 225 into a user interface 220. This API specification identifier 225 may indicate an API specification 230 for the server 205 to retrieve from a source 215. Additionally, the API specification identifier 225 may specify how to retrieve the API specification 230 (e.g., the user may provide the source 215 and any authentication needed to access information from the source 215). The format for the API specification identifier 225 may depend on the source 215 of the API specification 230. For example, different sources 215 may use different project identifiers, organization identifiers, version values, or some combination of these or other identification parameters to identify the indicated API (and the corresponding API specification 230). Particular API specification identifier 225 formats for different sources 215 may be documented (e.g., in a public portal) for user access. Based on the API specification identifier 225 received from the user device 210, the server 205 may retrieve the indicated API specification 230 from the corresponding source 215. Alternatively, the user may upload the API specification 230 directly to the server 205. In such an example, the user device 210 may be regarded as the source 215 of the API specification 230, and the API specification identifier 225 may be an explicit or implicit indication that the information provided to the mocking service 200 from the user includes the API specification 230 for simulation.

The server 205 may then parse the retrieved API specification 230 on-the-fly in memory 235. In some cases, the server 205 may contain a universal parser to handle API specifications 230 written using multiple different API design languages. For example, the universal parser may be an example of an API modeling framework (AMF) parser internal to the server 205. The server 205 may parse the API specification 230 to generate a mock model 240 for the API and may persist the mock model 240 in memory 235. This specification parsing process may be transparent to the user providing the API specification identifier 225.

The user may simulate mock requests 245 to this mock model 240 via the user interface 220. An API request may be formatted as a link to a particular URL and may include an endpoint, a method, one or more headers, and a set of data (i.e., the body of the request). For example, as illustrated in FIG. 2, the user may select "Endpoint1" as the endpoint for the mock request 245 in the user interface 220 and may test a "GET" method. Other methods supported by the mocking service 200 may include "PUT," "POST," "PATCH," "DELETE," or some combination of these or other API methods. A mock request 245 may include all or a subset of the parameters of a regular API request. For example, in some cases, a mock request 245 may not include data, and instead the API specification 230 may define values to use as mock data when performing testing on the API. To handle a mock request 245 sent by the user device 210, the server 205 may generate a mock implementation 250 of the API based on the mock request 245. This mock implementation 250 (i.e., a mock instance) may simulate the API handling and responding to such an API request, and may be temporarily cached in memory 235 at the server 205. To securely test the API, the server 205 may run the mock implementation 250 of the API internal to the server 205 without any database access. This may prevent the server 205 from altering any data at a database when the mocking service 200 is activated. Further, running the mock implementation 250 internal to the server 205 may reduce the processing time for the mock instance (e.g., as compared to mocking procedures that use external connections to retrieve information during the mocking procedures).

Running the mock implementation 250 based on the mock request 245 may result in a mock response 255. This mock response 255 may simulate an API response to an API request containing the same or similar parameters as the mock request 245. As such, this mock response 255 may be based on information in the API specification 230 (e.g., methods, data types, parameters, metadata, etc.). The server 205 may transmit the mock response 255 to the user device 210 in response to the mock request 245. The user device 210 may display the mock response 255 in the user interface 220. For example, as illustrated, the user interface 220 may display a mock response 255 with an HTTP status code of "200," indicating that the mock model 240 successfully handled the mock request 245. Other mock responses 255 may indicate problems with handling a mock request 245 using HTTP status codes, error messages, or both. These mock responses 255 may additionally indicate where the problem may have occurred (e.g., a status code in the 400s may indicate an error originating from the client, such as user device 210, while a status code in the 500s may indicate an error originating from the server 205). Based on the mock response 255 displayed in the user interface 220, the user may determine how to modify an API, an API specification 230, or an API request. By handling API specification 230 parsing and mock implementations 250 internally at the server 205, the mocking service 200 may support robust API simulations across multiple API design languages and sources 215.

Figure 3:
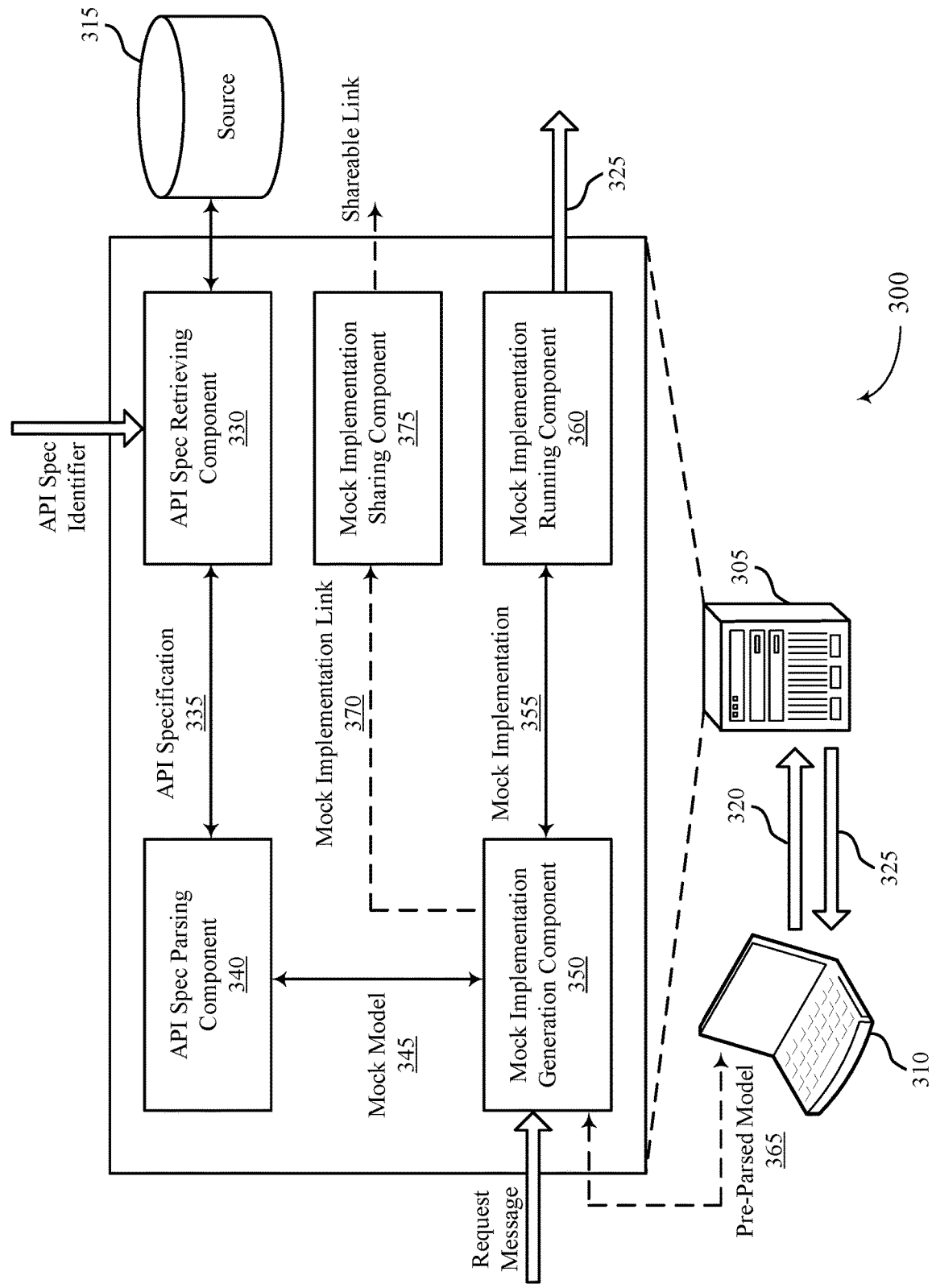

FIG. 3 illustrates an example of a mocking service 300 that supports API specification parsing at a mocking server in accordance with aspects of the present disclosure. The mocking service 300 may include a server 305, which may be an example of a mocking server or application server as described in FIG. 2. The server 305 may be configured to run mock implementations 355 of API specifications 335. The server 305 may receive information from a user device 310 (e.g., via a user interface) to generate mock models 345 and execute mock implementations 355.

In some cases, the server 305 may be configured to retrieve the API specifications 335 from one or more sources 315. A source 315 may be an example of an internal repository to the server 305 or a system served by the server 305, an external repository to the server 305, a shared code repository, a file upload, a database, a data store, a cloud-based storage entity, or some combination of these or other storage systems. Some examples of internal platform sources may include a Version Control System (VCS), an Exchange system, an API Manager (e.g., MuleSoft VCS, MuleSoft Exchange, MuleSoft API Manager), or other types of internal storage sources, systems, or services. Some examples of external platform sources may include a file upload, a shared code repository such as GitHub, or other types of external storage sources, systems, or services. In some cases, the server 305 or user device 310 may operate as the source 315 for an API specification 335.

The mocking service 300 may support secure, efficient API testing and validation. A mocking service user interface may allow a user operating the user device 310 to simulate requests 320 to an API in order to test that the API is functioning properly, troubleshoot problems, and/or to demo the API. For example, the mocking service 300 may expose an endpoint to a user that the user may use for testing an API prior to full implementation (e.g., publishing) of the API. This testing may be based on an API specification 335 and its underlying metadata. An API specification 335, as described herein, may refer to any document or program that defines at least a portion of the functionality of an API (e.g., including any combination of behaviors, definitions, documentation, etc. for the API). The user may validate whether the API is functioning properly based on results of the mocking service 300.

In an example, the user device 310 may transmit a request 320 to the server 305. The request 320 may include an identifier indicating an API specification 335 for an API. An API specification retrieving component 330 of the server 305 may process the API specification identifier and retrieve the API specification 335 from the source 315. For example, the API specification identifier may be an identifier for a Git repository, and the API specification retrieving component 330 may request to pull a version of the API specification 335 from the Git repository. In another example, the API specification identifier may include an upload of an API specification 335. In some cases, the API specification 335 may have been provided (e.g., uploaded) by the user device 310. If the API specification 335 is uploaded, the API specification retrieving component 330 may handle receipt of the API specification 335 from the upload source. The API specification retrieving component 330 may similarly handle retrieving the API specification 335 or receiving the API specification 335 for each of the different types or forms of the source 315 described herein.

In some cases, only authorized users or applications may have access to the API specification 335. For example, the user device 310 may provide (e.g., in the request 320) credentials to the server 305, and the server 305 may attempt to retrieve the API specification 335 from the source 315 based on the provided credentials. In other examples, when the server 305 attempts to retrieve the API specification 335 from the source 315, the source 315 may request access credentials, and the server 305 may request the relevant user credentials via a request to the user device 310. Once the server 305 has received user credentials (e.g., a username, password, security clearance level, access level, biometric, personal identification number (PIN), etc.), the server 305 may provide the credentials to the source 315, and the source 315 may indicate whether the credentials are sufficient to allow retrieving the indicated API specification 335. If, for example, the user device 310 does not have the authority to access the source 315 or does not have access to retrieve the indicated API specification 335 from the source 315, the API specification retrieving component 330 may refrain from retrieving the API specification 335 from the source 315 (or the source 315 may block the retrieval of the API specification 335 by the API specification retrieving component 330). The server 305 may then transmit an indication of the failure to retrieve the API specification 335 to the user device 310. If the user (e.g., using the user device 310) provides appropriate credentials (e.g., the source 315 verifies that the user may access the API specification 335 based on the credentials), the API specification retrieving component 330 may retrieve the API specification 335 from the source 315.

The API specification 335 may be written in one of multiple different API specification languages. By parsing the API specification 335 at the server 305, the server 305 may be capable of generating a mock implementation 355 for an API specification 335 written in any API specification language. Instead of the user device 310 providing a pre-parsed mock model 365, the server 305 may directly handle the API specification 335 and parse the API specification 335 to create a mock model 345 at the server 305. Thus, the server 305 is not restricted to handling pre-parsed mock models 365 or API specifications 335 written in a particular API specification language (or a limited number of API specification languages). This enables the server 305 to create mock implementations 355 for API specifications 335 written in a variety of different API specification languages. For example, the API specification 335 may be written using RAML 0.8, RAML 1.0, OpenAPI Specification (OAS) 2, OAS 3, or any other type of API specification language.

The API specification 335 may be parsed at the API specification parsing component 340. As described herein, the API specification parsing component 340 may be an example of a universal parser. The API specification parsing component 340 can parse an API specification 335 written using any, or at least a wide variety, of API specification languages. The parsing may occur in memory of the server 305. Thus, the server 305 may not have to use a separate entity to parse the API specification 335, though the server 305 may, in some cases, be configured to use another parsing entity separate to the server 305. The API specification parsing component 340 may parse the API specification 335 to generate or determine a mock model 345 for the API specification 335. The mock model 345 may be generated based on the API specification 335 and, in some cases, any metadata of the API specification 335. The mock model 345 may, in some cases, be referred to as a parsed model.

The mock model 345 may be stored in memory (e.g., locally cached) at the server 305. In some cases, the user device 310 may transmit a request message indicating a mock implementation 355 of the API. The request message indicating the mock implementation 355 of the API may initiate the server 305 to generate and run the mock implementation 355 of the API in order to test the API. The user device 310 may indicate the mock implementation 355 of the API via a request 320. The mock implementation 355 of the API may be generated based on the mock model 345 and, in some cases, any metadata of the API specification 335. In some cases, the request message indicating the mock implementation 355 may occur in the same request 320 as the request indicating the API specification identifier, or the mock implementation 355 may be included in a separate request message.

The server 305 may provide the mock model 345 to a mock implementation generation component 350. The mock implementation generation component 350 may generate the mock implementation 355 for the API. The mock implementation generation component 350 may be capable of generating a mock implementation 355 for an API from a mock model 345 based on any of multiple different API specification languages. For example, the mock model 345 may be based on various RAML releases, OAS releases, etc.

The server 305 may use a mock implementation running component 360 to run, in the memory of the server 305, the mock implementation 355 of the API according to the request message. For example, the mock implementation running component 360 may expose the mock implementation 355, or an endpoint of the mock implementation 355, that a user (e.g., the user operating the user device 310) can use for testing and validating the API. In some cases, the user may test, validate, or demonstrate the API via the mock implementation 355 prior to launching the API or prior to a real implementation of the API (e.g., where a real implementation of the API may affect data or other aspects of the API environment). The server 305 may provide mocking results 325 to the user device 310 based on running the mock implementation 355. The mocking results 325 may be displayed on the user interface at the user device 310. In some cases, the user of the user device 310 may interact with the user interface at the user device 310 to test and use the mock API implementation.

In some cases, the server 305 may perform a final validation of the mock model 345 prior to generating or running the mock implementation 355. For example, the server 305 may verify that the API specification 335, the mock model 345, the mock implementation 355, or any combination thereof do not include errors that may negatively affect or terminate execution of the mock implementation 355.

In some cases, the mocking service 300 may implement an authentication mechanism for generating or running the mock implementation. For example, authorized users or authorized applications may have access to the mock implementation 355, which may be based on the user or application's permissions to the source 315, while unauthorized users or unauthorized applications may not have access to the mock implementation 355. The server 305 may authenticate the request message with the source 315 based on a permission level of the user device 310 or of the user operating the user device 310 prior to running the mock implementation 355. If a user sends a request to run the mock implementation 355, but that user does not have an appropriate permissions level or authentication credential, the server 305 may not run the mock implementation 355. In some cases, mock implementation 355 access may be limited to a user that initially sent the API specification identifier to the server 305 (e.g., the user that initiated the mocking process).

A user may publicly share access to the mock implementation 355 by generating a shareable link. For example, when generating the mock implementation 355, the mock implementation generation component 350 may create a mock implementation link 370 corresponding to the mock implementation 355. The mock implementation sharing component 375 may provide the mock implementation link 370 to the user device 310, and the user of the user device 310 may be able to share the shareable link with other users or tenants of the server 305. Any user with the shareable link may have access to the mock implementation 355, and another user may use the shareable link to send a request message to run the mock implementation 355. The shareable link may act as an authentication credential for accessing an exposed endpoint of the mock implementation 355 via any user device 310. In some cases, the server 305 may create an expiration time for the shareable link. For example, the mock implementation link 370 may be configured to be alive indefinitely, for a day, for an hour, or for another configurable amount of time. Once the mock implementation link 370 has existed for the configured amount of time, the link may expire and may not be usable. In some cases, following expiration of the shareable link, a user with proper credentials for accessing the mock implementation 355 may re-request a shareable link, and the server 305 may re-generate a shareable link (e.g., with a new expiration time) for accessing the mock implementation 355.

Additionally or alternatively, the server 305 may be configured to process a pre-parsed mock model 365. For example, the user device 310 may upload a pre-parsed mock model 365, and the mock implementation generation component 350 may be configured to create a mock implementation 355 from the pre-parsed mock model 365. In this way, the server 305 may be configured to create mock implementations 355 by either retrieving an API specification 335 from a source 315 and parsing the API specification 335 in memory at the server 305 or by receiving a pre-parsed mock model 365 from the user device 310 directly. In some cases, the server 305 may still be configured to implement the security and authentication mechanisms while generating a mock implementation from a pre-parsed mock model 365. For example, the server 305 may still verify that a user requesting to create a mock implementation 355 from the pre-parsed mock model 365 has sufficient credentials or permissions to run the mock implementation 355 for the pre-parsed mock model 365.

The server 305 may thus implement the techniques described herein to improve accessibility for creating a mock implementation 355 of an API. Instead of requiring a pre-parsed mock model 365 of an API specification 335, the server 305 is configured to receive an identifier for an API specification 335, retrieve the API specification 335 from a source 315, and parse the API specification 335 in memory of the server 305 to create a mock model 345 of the API specification 335. In this way, the server 305 may be configured to run the mock implementation 355 of an API specification 335 written in one of multiple different API specification languages instead of supporting a reduced number of API specification languages. This may increase accessibility for users that may not have access to a specific API specification language parser and for users that write API specifications 335 in a variety of different API specification languages.

By implementing the techniques herein, the server 305 may not have to access a database to generate and run a mock implementation 355. The server 305 may parse the API specification 335, generate the mock implementation 355, and run the mock implementation 355 all in memory at the server 305. This may increase performance of running the mock implementation 355, as the server 305 may not have to wait for communicating back and forth with a database.

The components of the server 305 discussed herein may be implemented in hardware, software executed by a processor, firmware, or any combination thereof. These components may be physically located at various positions, including being distributed such that portions of functions are implemented at different physical locations by one or more physical devices. Additionally, the server 305 may include any combination of these components or additional components related to parsing API specifications of different API specification languages internally at the server 305.

Figure 4:
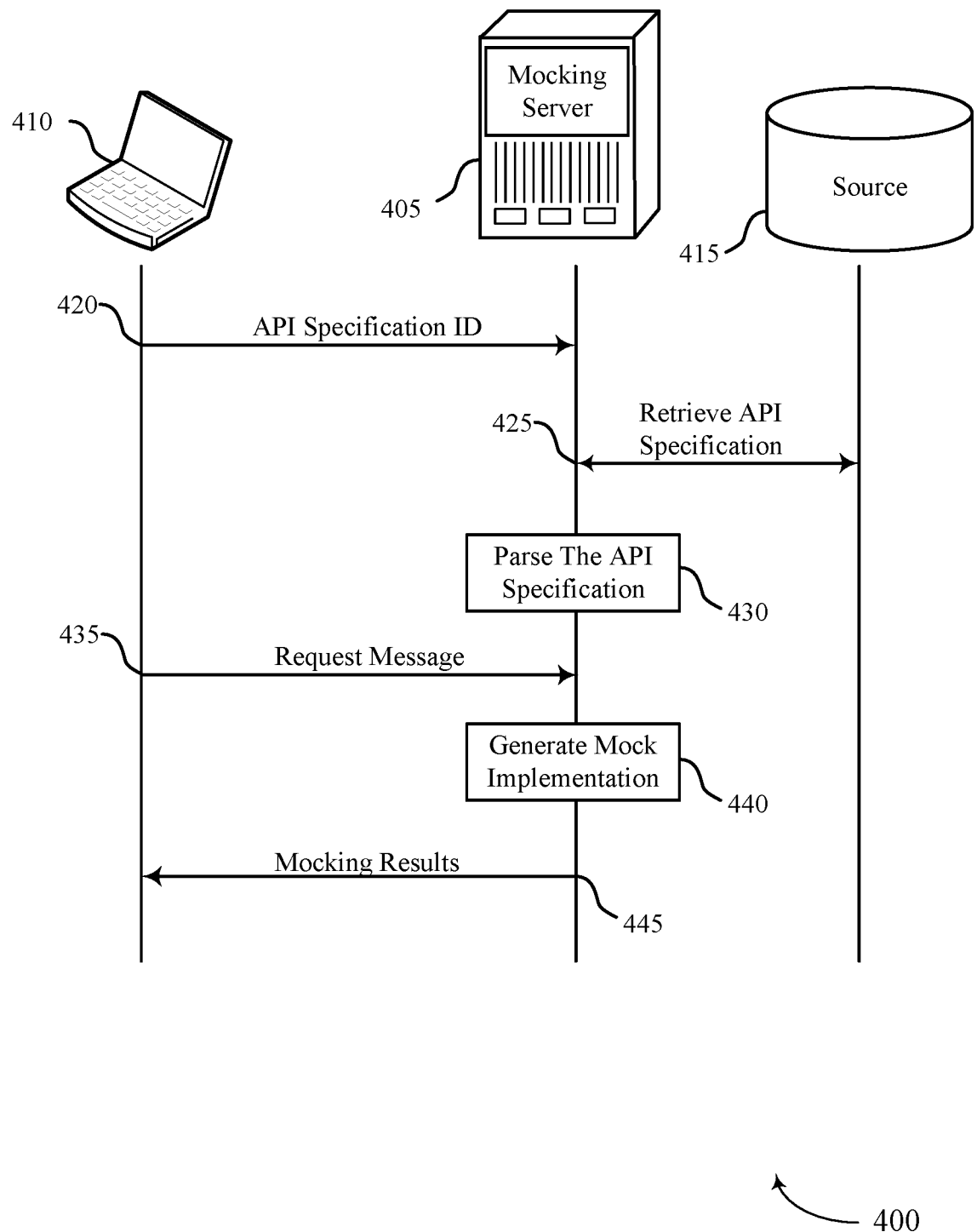
FIGS. 4 and 5 illustrate examples of process flows that support API specification parsing at a mocking server in accordance with aspects of the present disclosure.

FIG. 4 illustrates an example of a process flow 400 that supports API specification parsing at a mocking server in accordance with aspects of the present disclosure. The process flow 400 may include a server 405, a user device 410, and a source 415. The server 405 may be an example of a mocking server or a server 205 or 305 as described in FIGS. 2 and 3. The user device 410 may be an example of a user device 210 or a user device 310 as described in FIGS. 2 and 3. The source 415 may be an example of an internal or external source for an API specification, such as a source 215 or a source 315 as described in FIGS. 2 and 3. Alternative examples of the following may be implemented, where some steps are performed in a different order than described or are not performed at all. In some cases, steps may include additional features not mentioned below, or further steps may be added.

At 420, the server 405 may receive, from the user device 410, an identifier indicating an API specification for an API. The server 405 may identify a source for the API specification (e.g., the source 415) based on the identifier. At 425, the server 405 may retrieve the API specification based on the identifier. For example, the server 405 may retrieve the API specification from the source 415. The source 415 may be an example of an internal repository of the server, an external repository, a shared code repository, a file upload, a memory storage at the server, or a cloud storage, or any other type of storage server or storage service.

At 430, the server 405 may parse, in memory of the server 405, the API specification to determine a parsed model for the API specification. In some cases, the API specification may be written in one of multiple different API specification languages, and the server 405 may be configured to parse any of the multiple API specification languages. The parsed model for the API specification may be an example of a mock model as described herein.

At 435, the server 405 may receive, from the user device 410, a request message indicating a mock implementation of the API. The server 405 may generate the mock implementation of the API based on the parsed model for the API specification at 440. In some cases, the server 405 may verify the parsed model based on generating the mock implementation of the API, where verifying determines whether the mock implementation is generated successfully.

This may provide an opportunity for the server 405 to give feedback on the API specification or the parsed model, where the server 405 is configured to detect possible faults.

The server 405 may run, in the memory of the server, the mock implementation of the API according to the request message. By running the mock implementation of the API, the server 405 may expose an endpoint of the API which can be used for testing and validating, for example before an official release of the API. At 445, the server 405 may send the mocking results to the user device 410. For example, an indication of the mock implementation of the API may be displayed on a user interface at the user device 410. A user facilitating the user device 410 may be able to interact with the user interface to test functionality of the API via the mock implementation of the API hosted at the server 405.

Figure 5:
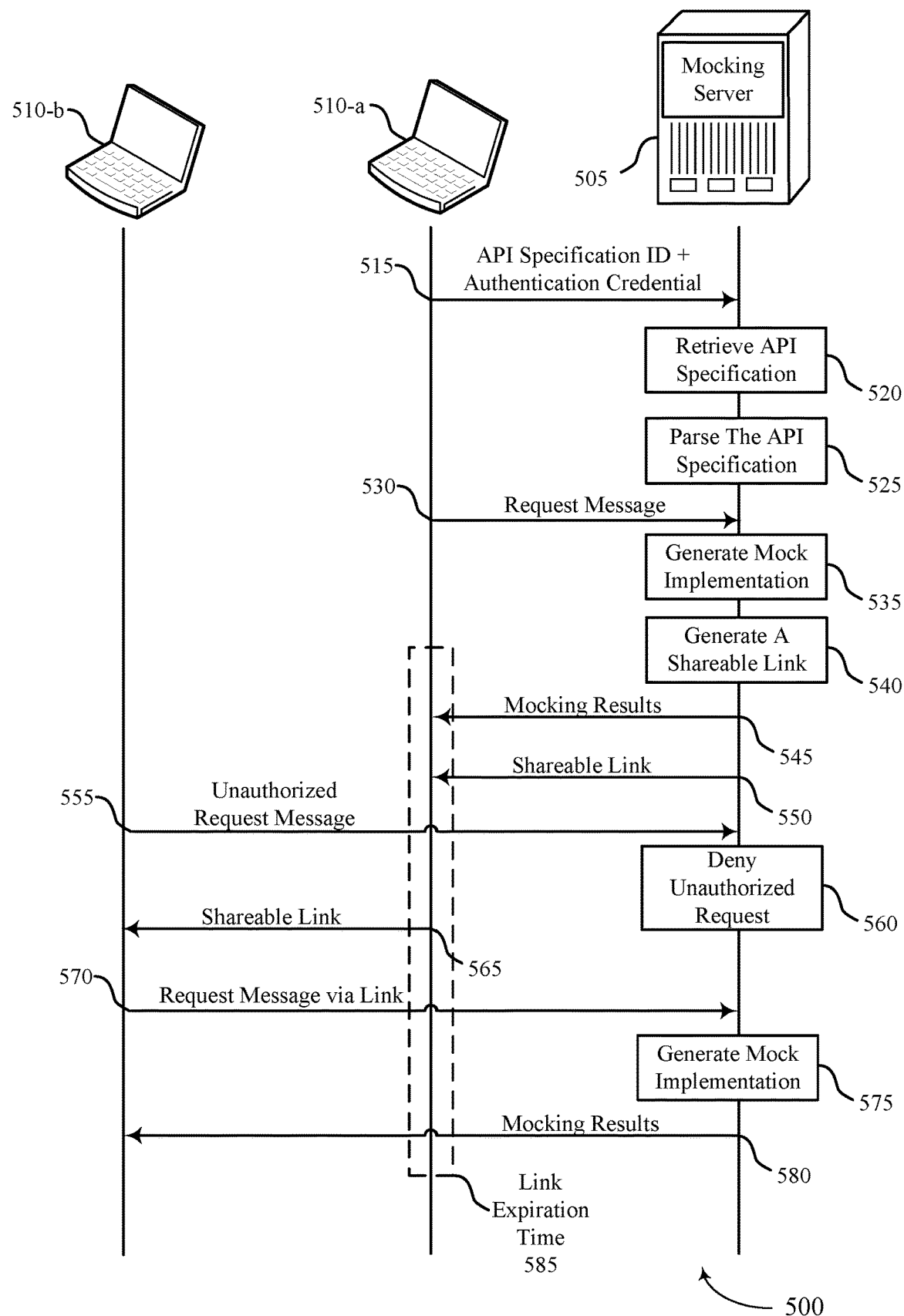

FIG. 5 illustrates an example of a process flow 500 that supports API specification parsing at a mocking server in accordance with aspects of the present disclosure. The process flow 500 may include a server 505 and user devices 510-a and 510-b. The server 505 may be an example of a mocking server or a server 205, a server 305, or a server 405 as described in FIGS. 2 through 4. The user devices 510-a and 510-b may each be an example of a user device 210, a user device 310, or a user device 410 as described in FIGS. 2 through 4. User device 510-a may have permission to access a source for an API specification, while user device 510-b does not have permission to access the source. Alternative examples of the following may be implemented, where some steps are performed in a different order than described or are not performed at all. In some cases, steps may include additional features not mentioned below, or further steps may be added.

At 515, user device 510-a may transmit, to the server 505, an identifier indicating an API specification for an API. The server 505 may retrieve the API specification based on the identifier at 520. In some cases, user device 510-a may also provide an authentication credential with the API specification identifier. The server 505 may provide the authentication credential to the source of the API specification and retrieve the API specification from the source based on providing the authentication credential. For example, user device 510-a may have a permissions level with the source such that user device 510-a can access the API specification. In some cases, the server 505 may authenticate user device 510-a with the source of the API specification based on the identifier. In other cases, the source may perform the authentication procedure for user device 510-a.

At 525, the server 505 may parse, in memory of the server 505, the API specification to determine a parsed model for the API specification. At 530, the server 505 may receive, from the user device 510-a, a request message indicating a mock implementation of the API. In some cases, the request message may include an authentication credential, which the server 505 may verify (e.g., with the source, with the mock model, or with both) prior to generating the mock implementation. At 535, the server 505 may generate the mock implementation of the API based on the parsed model for the API specification. In some cases, the server 505 may generate the mock implementation based on a permissions level of user device 510-a.

In some cases, the server 505 may generate a link to the mock implementation of the API at 540, where the link is configured to be shared from user device 510-a to other user devices 510. The server 505 may identify a configuration for the link including an expiration time for running the mock implementation based on the link. For example, the link may be usable between its time of creation at 540 and the end of the configured expiration time (e.g., at the link expiration time 585). The link may provide any user which has the link the same permissions level as user device 510-a. Thus, if user device 510-a is able to run the mock implementation, any user device 510 which has access to the link may also be allowed to run the mock implementation while the link is active (e.g., by accessing a mock implementation endpoint using the shareable link).

The server 505 may run, in the memory of the server 505, the mock implementation for the API according to the request message received at 530. The server 505 may provide the mocking results to user device 510-a at 545. The server 505 may also provide the link (i.e., the shareable link to the mocking implementation of the API) to user device 510-a at 550.

User device 510-b may not have the same permissions or authorizations as user device 510-a. Therefore, when user device 510-b transmits a request message (e.g., an unauthorized request message) to the server 505 indicating the mock implementation of the API at 555, the server 505 may restrict access to the mock implementation of the API for the unauthorized user device 510-b at 560.

To provide user device 510-b with access to the mock implementation, user device 510-a may share the link to the mock implementation with user device 510-b at 565. User device 510-b may send a request message indicating the mock implementation of the API based on the link at 570. At 575, the server 505 may run, in the memory of the server 505, the mock implementation of the API according to the request message using the link. The server 505 may provide, at 580, the mocking results to user device 510-b. User device 510-b may transmit the request message using the link by, for example, clicking on the link or inputting the link into a mocking user interface. As described herein, the link may be configured to be valid for a configurable period of time. For example, if user device 510-b or another user device 510 were to use the link after the link expiration time 585, that user device 510 may be denied access to the mock implementation.

Figure 6:
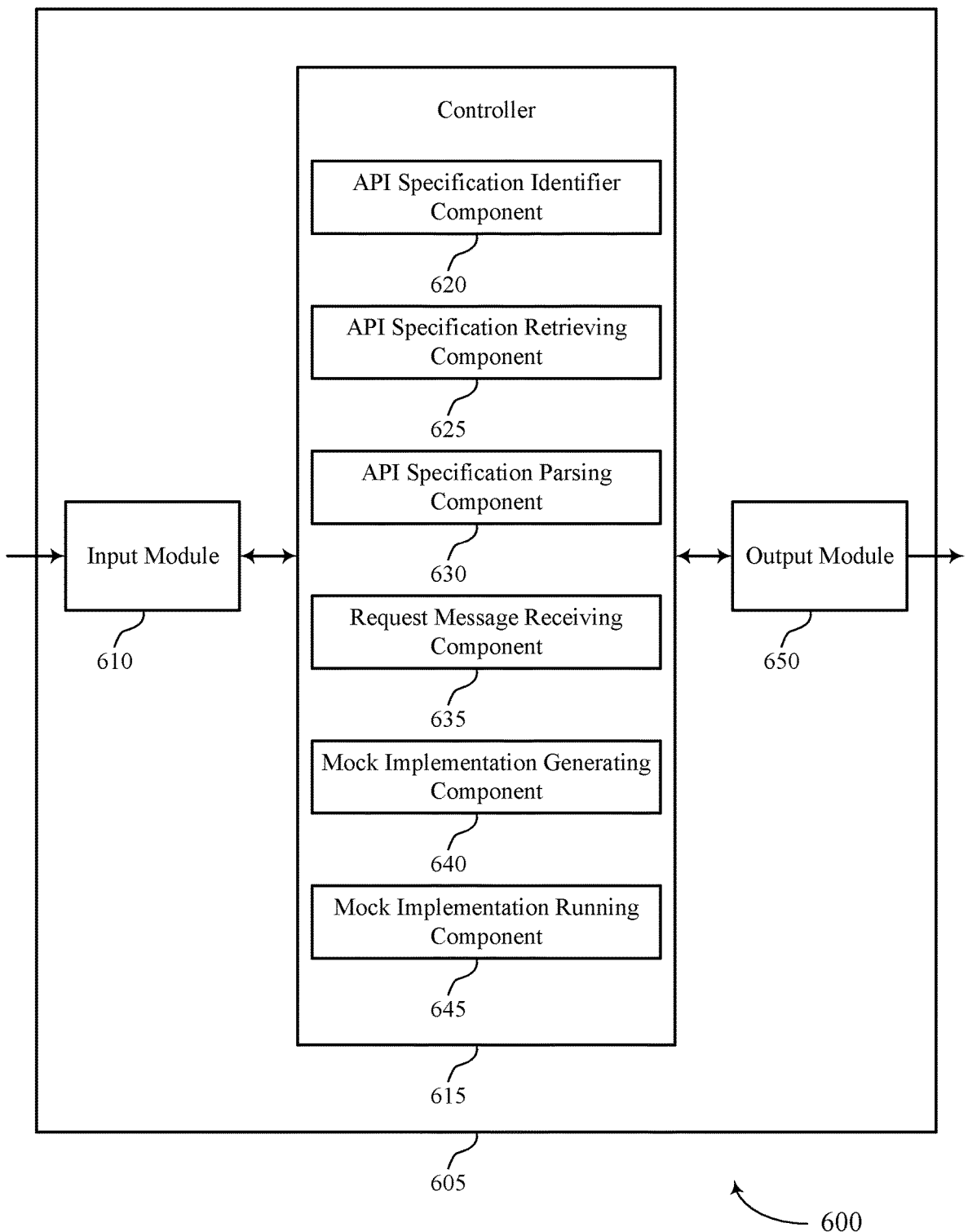
FIG. 6 shows a block diagram of an apparatus that supports API specification parsing at a mocking server in accordance with aspects of the present disclosure.

FIG. 6 shows a block diagram 600 of an apparatus 605 that supports API specification parsing at a mocking server in accordance with aspects of the present disclosure. The apparatus 605 may include an input module 610, a controller 615, and an output module 650. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the controller 615 to support API specification parsing at a mocking server. In some cases, the input module 610 may be a component of an input/output (I/O) controller 815 as described with reference to FIG. 8.

The controller 615 may include an API specification identifier component 620, an API specification retrieving component 625, an API specification parsing component 630, a request message receiving component 635, a mock implementation generating component 640, and a mock implementation running component 645. The controller 615 may be an example of aspects of the controller 705 or 810 described with reference to FIGS. 7 and 8.

The controller 615 and/or at least some of its various sub-components may be implemented in hardware, software executed by a processor, firmware, or any combination thereof. If implemented in software executed by a processor, the functions of the controller 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The controller 615 and/or at least some of its various sub-components may be physically located at various positions, including being distributed such that portions of functions are implemented at different physical locations by one or more physical devices. In some examples, the controller 615 and/or at least some of its various sub-components may be a separate and distinct component in accordance with various aspects of the present disclosure. In other examples, the controller 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The controller 615 may test an API at a server. The API specification identifier component 620 may receive, from a user device, an identifier indicating an API specification for the API. The API specification retrieving component 625 may retrieve the API specification based on the identifier. The API specification parsing component 630 may parse, in memory of the server, the API specification to determine a parsed model for the API specification. The request message receiving component 635 may receive, from the user device, a request message indicating a mock implementation of the API. The mock implementation generating component 640 may generate the mock implementation of the API based on the parsed model for the API specification. The mock implementation running component 645 may run, in the memory of the server, the mock implementation of the API according to the request message.

The output module 650 may manage output signals for the apparatus 605. For example, the output module 650 may receive signals from other components of the apparatus 605, such as the controller 615, and may transmit these signals to other components or devices. In some specific examples, the output module 650 may transmit output signals for display in a user interface, for storage in a database or data store, for further processing at a server or server cluster, or for any other processes at any number of devices or systems. In some cases, the output module 650 may be a component of an I/O controller 815 as described with reference to FIG. 8.

Figure 7:
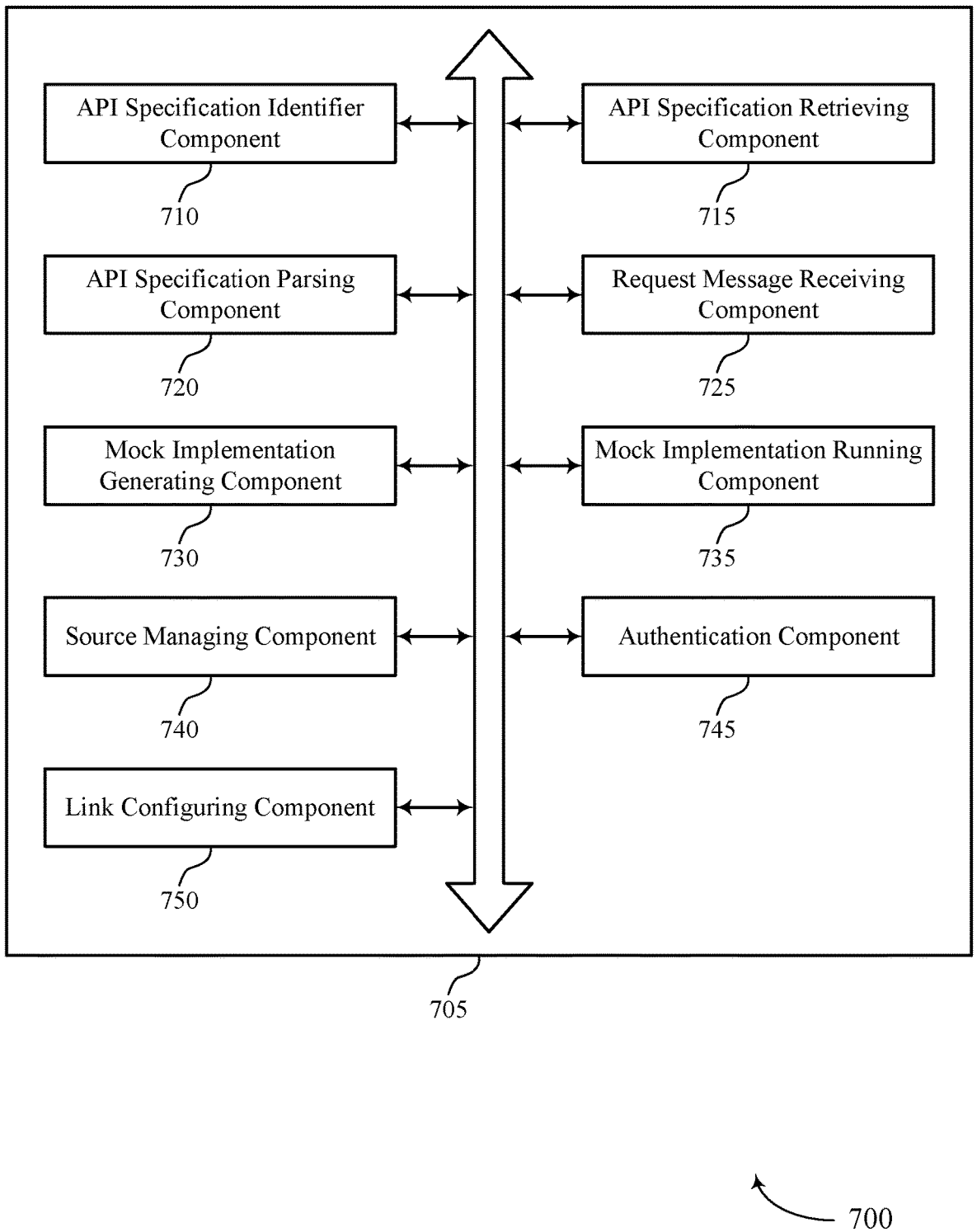
FIG. 7 shows a block diagram of a controller that supports API specification parsing at a mocking server in accordance with aspects of the present disclosure.

FIG. 7 shows a block diagram 700 of a controller 705 that supports API specification parsing at a mocking server in accordance with aspects of the present disclosure. The controller 705 may be an example of aspects of a controller 615 or a controller 810 described herein. The controller 705 may include an API specification identifier component 710, an API specification retrieving component 715, an API specification parsing component 720, a request message receiving component 725, a mock implementation generating component 730, a mock implementation running component 735, a source managing component 740, an authentication component 745, and a link configuring component 750. Each of these modules may communicate, directly or indirectly, with one another (e.g., via one or more buses). The controller 705 may test an API at a server.

The API specification identifier component 710 may receive, from a user device, an identifier indicating an API specification for the API. The API specification retrieving component 715 may retrieve the API specification based on the identifier. The API specification parsing component 720 may parse, in memory of the server, the API specification to determine a parsed model for the API specification.

The request message receiving component 725 may receive, from the user device, a request message indicating a mock implementation of the API. In some examples, the request message receiving component 725 may receive, from the user device, an additional request message indicating an additional mock implementation.

The mock implementation generating component 730 may generate the mock implementation of the API based on the parsed model for the API specification. In some examples, the mock implementation generating component 730 may verify the parsed model based on generating the mock implementation of the API, where the verifying determines whether the mock implementation is generated successfully.

In some examples, the mock implementation generating component 730 may receive, from the user device, a pre-parsed mock model for an additional API specification. In some examples, the mock implementation generating component 730 may generate an additional mock implementation based on the pre-parsed mock model for the additional API specification. In some cases, the mock implementation for the API is generated based on metadata of the API specification.

The mock implementation running component 735 may run, in the memory of the server, the mock implementation of the API according to the request message. In some examples, the mock implementation running component 735 may run, in the memory of the server, the additional mock implementation according to an additional request message. In some cases, the mock implementation of the API is run in the memory of the server and generated on the fly without accessing a database.

The source managing component 740 may identify a source of the API specification based on the identifier, where the API specification is retrieved from the source. In some examples, the source managing component 740 may receive, from the user device, an authentication credential.

In some examples, the source managing component 740 may provide the authentication credential to the source of the API specification, where the API specification is retrieved from the source based on providing the authentication credential. In some examples, the source managing component 740 may authenticate the user device with the source of the API specification based on the identifier. In some cases, the source is an internal repository of the server, an external repository, a shared code repository, a file upload, a memory storage at the server, or a cloud storage.

The authentication component 745 may authenticate the request message based on a permission level associated with the user device prior to running the mock implementation of the API. In some examples, the authentication component 745 may receive, from an unauthorized user device, an unauthorized request message indicating the mock implementation of the API. In some examples, the authentication component 745 may restrict access to the mock implementation of the API for the unauthorized user device. In some cases, the API specification is written in one of a set of API specification languages, and the server is configured to parse any of the set of API specification languages.

The link configuring component 750 may generate a link to the mock implementation of the API, the link configured to be shared from the user device to an additional user device. In some examples, the link configuring component 750 may provide the link to the mock implementation of the API to the user device. In some examples, the link configuring component 750 may receive, from the additional user device, an additional request message indicating the mock implementation of the API based on the link. In some examples, the link configuring component 750 may run, in the memory of the server, the mock implementation of the API according to the additional request message.

In some examples, the link configuring component 750 may identify a configuration for the link including an expiration time for running the mock implementation based on the link. In some examples, the link configuring component 750 may deactivate the link after the expiration time.

Figure 8:
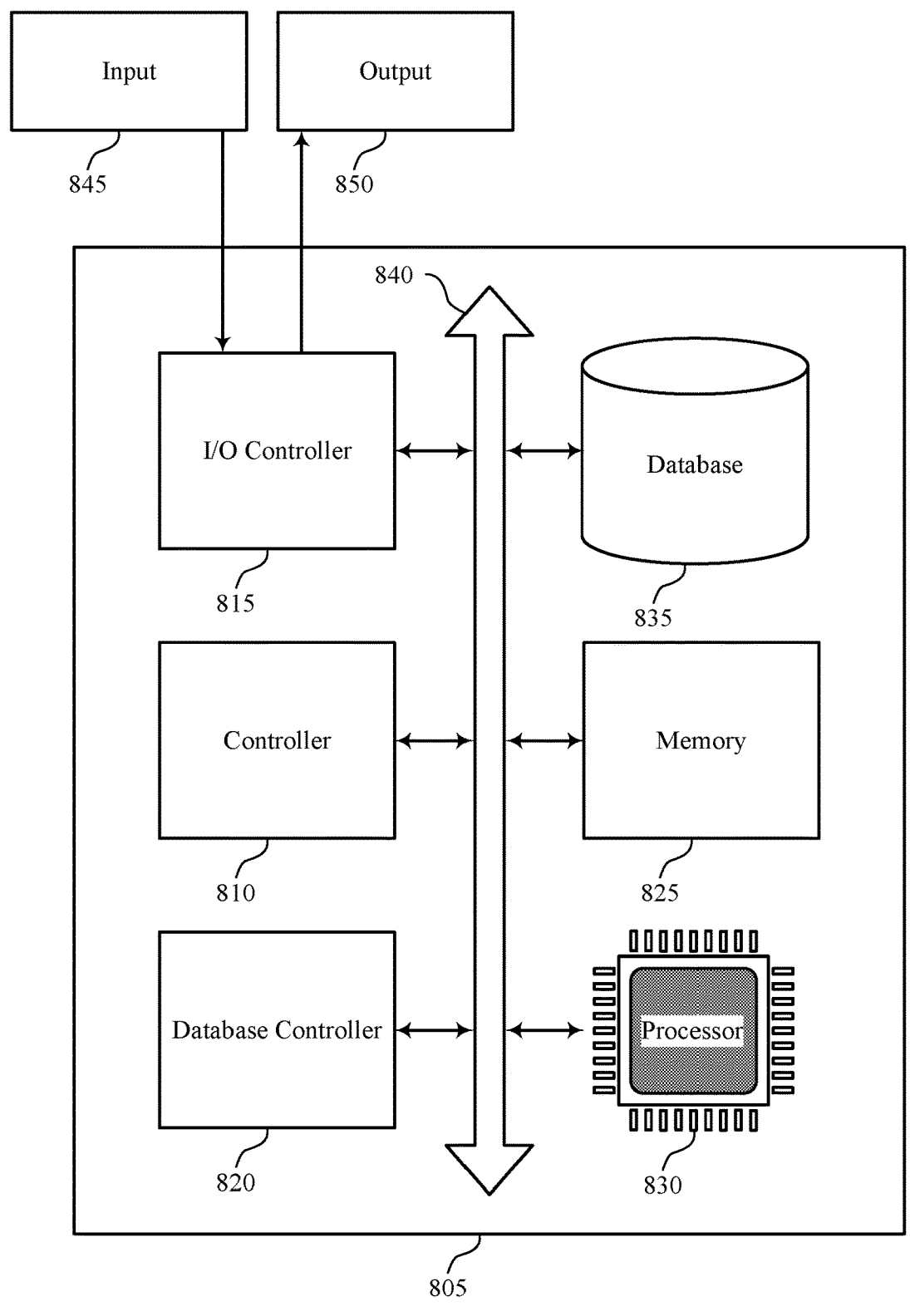
FIG. 8 shows a diagram of a system including a device that supports API specification parsing at a mocking server in accordance with aspects of the present disclosure.

FIG. 8 shows a diagram of a system 800 including a device 805 that supports API specification parsing at a mocking server in accordance with aspects of the present disclosure. The device 805 may be an example of or include the components of an application server or an apparatus 605 as described herein. The device 805 may include components for bi-directional data communications including components for transmitting and receiving communications, including a controller 810, an I/O controller 815, a database controller 820, memory 825, a processor 830, and a database 835. These components may be in electronic communication via one or more buses (e.g., bus 840).

The controller 810 may be an example of a controller 615 or 705 as described herein. For example, the controller 810 may perform any of the methods or processes described above with reference to FIGS. 6 and 7. In some cases, the controller 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting API specification parsing at a mocking server).

Figure 9:
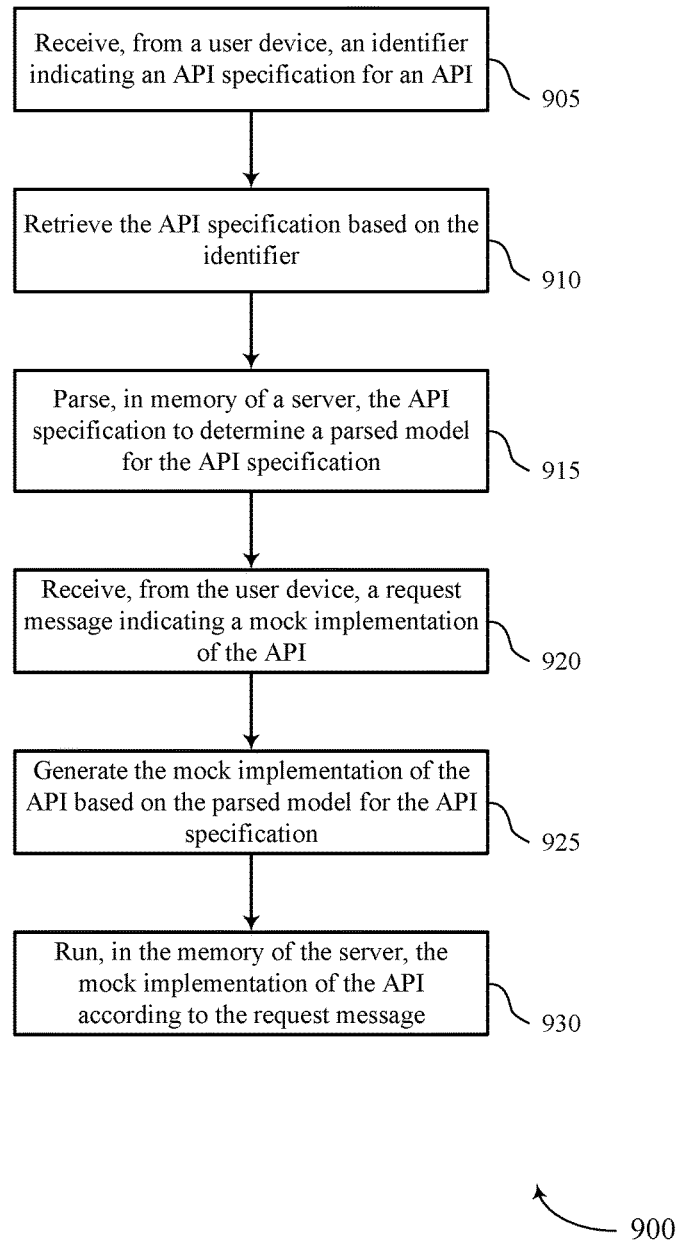
FIGS. 9 through 12 show flowcharts illustrating methods that support API specification parsing at a mocking server in accordance with aspects of the present disclosure.

FIG. 9 shows a flowchart illustrating a method 900 that supports API specification parsing at a mocking server in accordance with aspects of the present disclosure. The operations of method 900 may be implemented by an application server or its components as described herein. For example, the operations of method 900 may be performed by a controller as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 905, the application server may receive, from a user device, an identifier indicating an API specification for an API. The operations of 905 may be performed according to the methods described herein. In some examples, aspects of the operations of 905 may be performed by an API specification identifier component as described with reference to FIGS. 6 through 8.

At 910, the application server may retrieve the API specification based on the identifier. The operations of 910 may be performed according to the methods described herein. In some examples, aspects of the operations of 910 may be performed by an API specification retrieving component as described with reference to FIGS. 6 through 8.

At 915, the application server may parse, in memory of the server, the API specification to determine a parsed model for the API specification. The operations of 915 may be performed according to the methods described herein. In some examples, aspects of the operations of 915 may be performed by an API specification parsing component as described with reference to FIGS. 6 through 8.

At 920, the application server may receive, from the user device, a request message indicating a mock implementation of the API. The operations of 920 may be performed according to the methods described herein. In some examples, aspects of the operations of 920 may be performed by a request message receiving component as described with reference to FIGS. 6 through 8.

At 925, the application server may generate the mock implementation of the API based on the parsed model for the API specification. The operations of 925 may be performed according to the methods described herein. In some examples, aspects of the operations of 925 may be performed by a mock implementation generating component as described with reference to FIGS. 6 through 8.

At 930, the application server may run, in the memory of the server, the mock implementation of the API according to the request message. The operations of 930 may be performed according to the methods described herein. In some examples, aspects of the operations of 930 may be performed by a mock implementation running component as described with reference to FIGS. 6 through 8.

Figure 10:
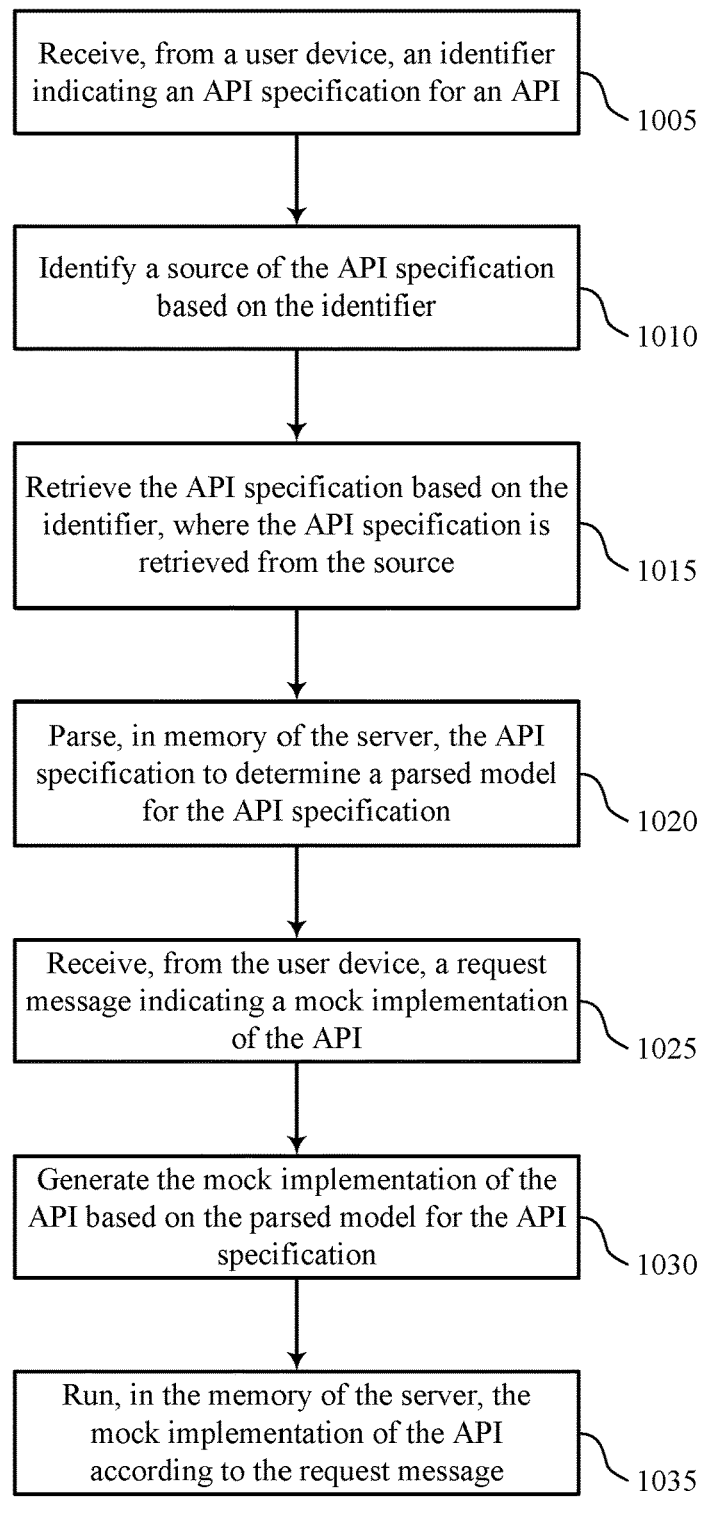

FIG. 10 shows a flowchart illustrating a method 1000 that supports API specification parsing at a mocking server in accordance with aspects of the present disclosure. The operations of method 1000 may be implemented by an application server or its components as described herein. For example, the operations of method 1000 may be performed by a controller as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1005, the application server may receive, from a user device, an identifier indicating an API specification for an API. The operations of 1005 may be performed according to the methods described herein. In some examples, aspects of the operations of 1005 may be performed by an API specification identifier component as described with reference to FIGS. 6 through 8.

At 1010, the application server may identify a source of the API specification based on the identifier, where the API specification is retrieved from the source. The operations of 1010 may be performed according to the methods described herein. In some examples, aspects of the operations of 1010 may be performed by a source managing component as described with reference to FIGS. 6 through 8.

At 1015, the application server may retrieve the API specification based on the identifier. The operations of 1015 may be performed according to the methods described herein. In some examples, aspects of the operations of 1015 may be performed by an API specification retrieving component as described with reference to FIGS. 6 through 8.

At 1020, the application server may parse, in memory of the server, the API specification to determine a parsed model for the API specification. The operations of 1020 may be performed according to the methods described herein. In some examples, aspects of the operations of 1020 may be performed by an API specification parsing component as described with reference to FIGS. 6 through 8.

At 1025, the application server may receive, from the user device, a request message indicating a mock implementation of the API. The operations of 1025 may be performed according to the methods described herein. In some examples, aspects of the operations of 1025 may be performed by a request message receiving component as described with reference to FIGS. 6 through 8.

At 1030, the application server may generate the mock implementation of the API based on the parsed model for the API specification. The operations of 1030 may be performed according to the methods described herein. In some examples, aspects of the operations of 1030 may be performed by a mock implementation generating component as described with reference to FIGS. 6 through 8.

At 1035, the application server may run, in the memory of the server, the mock implementation of the API according to the request message. The operations of 1035 may be performed according to the methods described herein. In some examples, aspects of the operations of 1035 may be performed by a mock implementation running component as described with reference to FIGS. 6 through 8.

Figure 11:
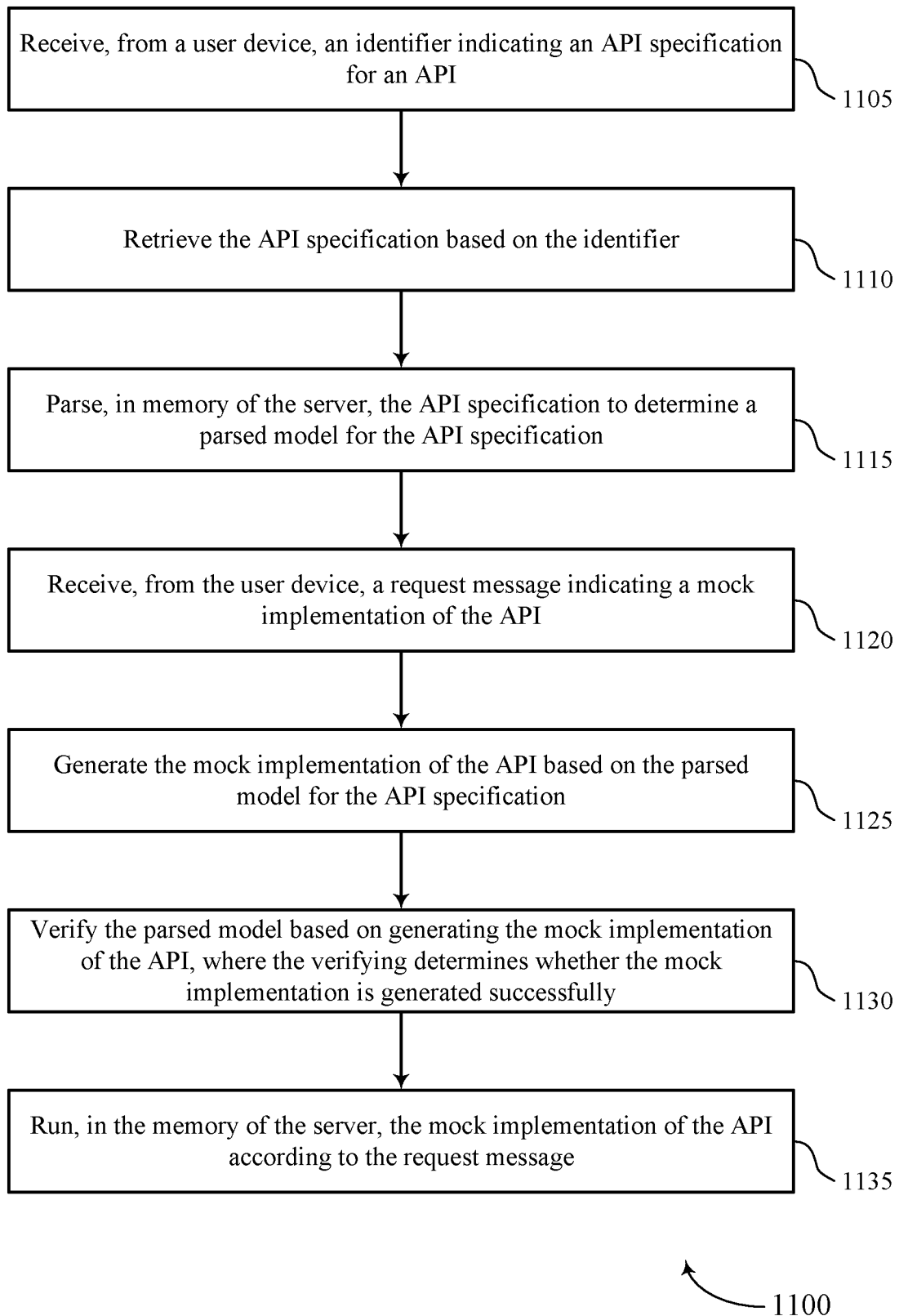

FIG. 11 shows a flowchart illustrating a method 1100 that supports API specification parsing at a mocking server in accordance with aspects of the present disclosure. The operations of method 1100 may be implemented by an application server or its components as described herein. For example, the operations of method 1100 may be performed by a controller as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1105, the application server may receive, from a user device, an identifier indicating an API specification for an API. The operations of 1105 may be performed according to the methods described herein. In some examples, aspects of the operations of 1105 may be performed by an API specification identifier component as described with reference to FIGS. 6 through 8.

At 1110, the application server may retrieve the API specification based on the identifier. The operations of 1110 may be performed according to the methods described herein. In some examples, aspects of the operations of 1110 may be performed by an API specification retrieving component as described with reference to FIGS. 6 through 8.

At 1115, the application server may parse, in memory of the server, the API specification to determine a parsed model for the API specification. The operations of 1115 may be performed according to the methods described herein. In some examples, aspects of the operations of 1115 may be performed by an API specification parsing component as described with reference to FIGS. 6 through 8.

At 1120, the application server may receive, from the user device, a request message indicating a mock implementation of the API. The operations of 1120 may be performed according to the methods described herein. In some examples, aspects of the operations of 1120 may be performed by a request message receiving component as described with reference to FIGS. 6 through 8.

At 1125, the application server may generate the mock implementation of the API based on the parsed model for the API specification. The operations of 1125 may be performed according to the methods described herein. In some examples, aspects of the operations of 1125 may be performed by a mock implementation generating component as described with reference to FIGS. 6 through 8.

At 1130, the application server may verify the parsed model based on generating the mock implementation of the API, where the verifying determines whether the mock implementation is generated successfully. The operations of 1130 may be performed according to the methods described herein. In some examples, aspects of the operations of 1130 may be performed by a mock implementation generating component as described with reference to FIGS. 6 through 8.

At 1135, the application server may run, in the memory of the server, the mock implementation of the API according to the request message. The operations of 1135 may be performed according to the methods described herein. In some examples, aspects of the operations of 1135 may be performed by a mock implementation running component as described with reference to FIGS. 6 through 8.

Figure 12:
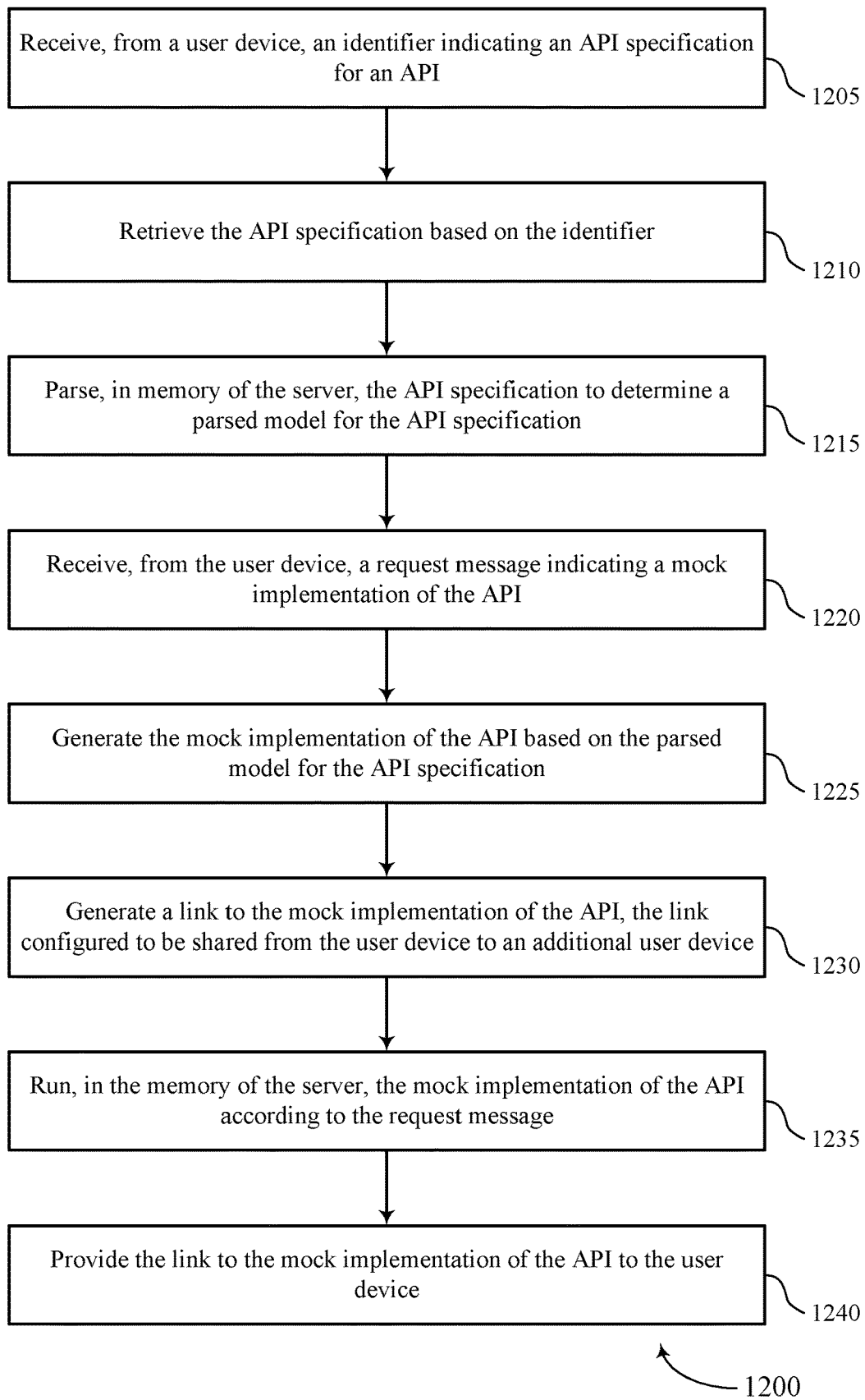

FIG. 12 shows a flowchart illustrating a method 1200 that supports API specification parsing at a mocking server in accordance with aspects of the present disclosure. The operations of method 1200 may be implemented by an application server or its components as described herein. For example, the operations of method 1200 may be performed by a controller as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1205, the application server may receive, from a user device, an identifier indicating an API specification for an API. The operations of 1205 may be performed according to the methods described herein. In some examples, aspects of the operations of 1205 may be performed by an API specification identifier component as described with reference to FIGS. 6 through 8.

At 1210, the application server may retrieve the API specification based on the identifier. The operations of 1210 may be performed according to the methods described herein. In some examples, aspects of the operations of 1210 may be performed by an API specification retrieving component as described with reference to FIGS. 6 through 8.

At 1215, the application server may parse, in memory of the server, the API specification to determine a parsed model for the API specification. The operations of 1215 may be performed according to the methods described herein. In some examples, aspects of the operations of 1215 may be performed by an API specification parsing component as described with reference to FIGS. 6 through 8.

At 1220, the application server may receive, from the user device, a request message indicating a mock implementation of the API. The operations of 1220 may be performed according to the methods described herein. In some examples, aspects of the operations of 1220 may be performed by a request message receiving component as described with reference to FIGS. 6 through 8.

At 1225, the application server may generate the mock implementation of the API based on the parsed model for the API specification. The operations of 1225 may be performed according to the methods described herein. In some examples, aspects of the operations of 1225 may be performed by a mock implementation generating component as described with reference to FIGS. 6 through 8.

At 1230, the application server may generate a link to the mock implementation of the API, the link configured to be shared from the user device to an additional user device. The operations of 1230 may be performed according to the methods described herein. In some examples, aspects of the operations of 1230 may be performed by a link configuring component as described with reference to FIGS. 6 through 8.

At 1235, the application server may run, in the memory of the server, the mock implementation of the API according to the request message. The operations of 1235 may be performed according to the methods described herein. In some examples, aspects of the operations of 1235 may be performed by a mock implementation running component as described with reference to FIGS. 6 through 8.

At 1240, the application server may provide the link to the mock implementation of the API to the user device. The operations of 1240 may be performed according to the methods described herein. In some examples, aspects of the operations of 1240 may be performed by a link configuring component as described with reference to FIGS. 6 through 8.

A method of testing an API at a server is described. The method may include receiving, from a user device, an identifier indicating an API specification for the API, retrieving the API specification based on the identifier, parsing, in memory of the server, the API specification to determine a parsed model for the API specification, receiving, from the user device, a request message indicating a mock implementation of the API, generating the mock implementation of the API based on the parsed model for the API specification, and running, in the memory of the server, the mock implementation of the API according to the request message.

An apparatus for testing an API at a server is described. The apparatus may include a processor, memory in electronic communication with the processor, and instructions stored in the memory. The instructions may be executable by the processor to cause the apparatus to receive, from a user device, an identifier indicating an API specification for the API, retrieve the API specification based on the identifier, parse, in memory of the server, the API specification to determine a parsed model for the API specification, receive, from the user device, a request message indicating a mock implementation of the API, generate the mock implementation of the API based on the parsed model for the API specification, and run, in the memory of the server, the mock implementation of the API according to the request message.

Another apparatus for testing an API at a server is described. The apparatus may include means for receiving, from a user device, an identifier indicating an API specification for the API, retrieving the API specification based on the identifier, parsing, in memory of the server, the API specification to determine a parsed model for the API specification, receiving, from the user device, a request message indicating a mock implementation of the API, generating the mock implementation of the API based on the parsed model for the API specification, and running, in the memory of the server, the mock implementation of the API according to the request message.

A non-transitory computer-readable medium storing code for testing an API at a server is described. The code may include instructions executable by a processor to receive, from a user device, an identifier indicating an API specification for the API, retrieve the API specification based on the identifier, parse, in memory of the server, the API specification to determine a parsed model for the API specification, receive, from the user device, a request message indicating a mock implementation of the API, generate the mock implementation of the API based on the parsed model for the API specification, and run, in the memory of the server, the mock implementation of the API according to the request message.

Some examples of the method, apparatuses, and non-transitory computer-readable medium described herein may further include operations, features, means, or instructions for identifying a source of the API specification based on the identifier, where the API specification may be retrieved from the source.

Some examples of the method, apparatuses, and non-transitory computer-readable medium described herein may further include operations, features, means, or instructions for receiving, from the user device, an authentication credential and providing the authentication credential to the source of the API specification, where the API specification may be retrieved from the source based on providing the authentication credential.

Some examples of the method, apparatuses, and non-transitory computer-readable medium described herein may further include operations, features, means, or instructions for authenticating the user device with the source of the API specification based on the identifier.

In some examples of the method, apparatuses, and non-transitory computer-readable medium described herein, the source may be an internal repository of the server, an external repository, a shared code repository, a file upload, a memory storage at the server, or a cloud storage.

Some examples of the method, apparatuses, and non-transitory computer-readable medium described herein may further include operations, features, means, or instructions for verifying the parsed model based on generating the mock implementation of the API, where the verifying determines whether the mock implementation may be generated successfully.

Some examples of the method, apparatuses, and non-transitory computer-readable medium described herein may further include operations, features, means, or instructions for authenticating the request message based on a permission level associated with the user device prior to running the mock implementation of the API.

In some examples of the method, apparatuses, and non-transitory computer-readable medium described herein, the API specification may be written in one of a set of API specification languages, and the server may be configured to parse any of the set of API specification languages.

Some examples of the method, apparatuses, and non-transitory computer-readable medium described herein may further include operations, features, means, or instructions for generating a link to the mock implementation of the API, the link configured to be shared from the user device to an additional user device, and providing the link to the mock implementation of the API to the user device.

Some examples of the method, apparatuses, and non-transitory computer-readable medium described herein may further include operations, features, means, or instructions for receiving, from the additional user device, an additional request message indicating the mock implementation of the API based on the link and running, in the memory of the server, the mock implementation of the API according to the additional request message.

Some examples of the method, apparatuses, and non-transitory computer-readable medium described herein may further include operations, features, means, or instructions for identifying a configuration for the link including an expiration time for running the mock implementation based on the link and deactivating the link after the expiration time.

Some examples of the method, apparatuses, and non-transitory computer-readable medium described herein may further include operations, features, means, or instructions for receiving, from an unauthorized user device, an unauthorized request message indicating the mock implementation of the API and restricting access to the mock implementation of the API for the unauthorized user device.

In some examples of the method, apparatuses, and non-transitory computer-readable medium described herein, the mock implementation of the API may be run in the memory of the server and generated on the fly without accessing a database.

In some examples of the method, apparatuses, and non-transitory computer-readable medium described herein, the mock implementation for the API may be generated based on metadata of the API specification.

Some examples of the method, apparatuses, and non-transitory computer-readable medium described herein may further include operations, features, means, or instructions for receiving, from the user device, a pre-parsed mock model for an additional API specification, receiving, from the user device, an additional request message indicating an additional mock implementation, generating the additional mock implementation based on the pre-parsed mock model for the additional API specification, and running, in the memory of the server, the additional mock implementation according to the additional request message.

It should be noted that the methods described above describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for testing an application programming interface (API) at a server, comprising:
   receiving, from a user device, an identifier indicating an API specification for the API;
   retrieving the API specification based at least in part on the identifier;
   parsing, in memory of the server, the API specification to determine a parsed model for the API specification;
   receiving, from the user device, a request message indicating a mock implementation of the API;
   generating the mock implementation of the API based at least in part on the parsed model for the API specification;
   generating a link to the mock implementation of the API, the link configured to be shared from the user device to an additional user device;
   providing the link to the mock implementation of the API to the user device; and
   running, in the memory of the server, the mock implementation of the API according to the request message.

2. The method of claim 1, further comprising:
   identifying a source of the API specification based at least in part on the identifier, wherein the API specification is retrieved from the source.

3. The method of claim 2, further comprising:
   receiving, from the user device, an authentication credential; and
   providing the authentication credential to the source of the API specification, wherein the API specification is retrieved from the source based at least in part on providing the authentication credential.

4. The method of claim 2, further comprising:
   authenticating the user device with the source of the API specification based at least in part on the identifier.

5. The method of claim 2, wherein the source is an internal repository of the server, an external repository, a shared code repository, a file upload, a memory storage at the server, or a cloud storage.

6. The method of claim 1, further comprising:
   verifying the parsed model based at least in part on generating the mock implementation of the API, wherein the verifying determines whether the mock implementation is generated successfully.

7. The method of claim 1, further comprising:
   authenticating the request message based at least in part on a permission level associated with the user device prior to running the mock implementation of the API.

8. The method of claim 1, wherein the API specification is written in one of a plurality of API specification languages, and the server is configured to parse any of the plurality of API specification languages.

9. The method of claim 1, further comprising:
   receiving, from the additional user device, an additional request message indicating the mock implementation of the API based at least in part on the link; and
   running, in the memory of the server, the mock implementation of the API according to the additional request message.

10. The method of claim 1, further comprising:
    identifying a configuration for the link comprising an expiration time for running the mock implementation based at least in part on the link; and
    deactivating the link after the expiration time.

11. The method of claim 1, further comprising:
    receiving, from an unauthorized user device, an unauthorized request message indicating the mock implementation of the API; and
    restricting access to the mock implementation of the API for the unauthorized user device.

12. The method of claim 1, wherein the mock implementation of the API is run in the memory of the server and generated on the fly without accessing a database.

13. The method of claim 1, wherein the mock implementation for the API is generated based at least in part on metadata of the API specification.

14. The method of claim 1, further comprising:
receiving, from the user device, a pre-parsed mock model for an additional API specification;
receiving, from the user device, an additional request message indicating an additional mock implementation;
generating the additional mock implementation based at least in part on the pre-parsed mock model for the additional API specification; and
running, in the memory of the server, the additional mock implementation according to the additional request message.

15. An apparatus for testing an application programming interface (API) at a server, comprising:
a processor;
memory in electronic communication with the processor; and
instructions stored in the memory and executable by the processor to cause the apparatus to:
receive, from a user device, an identifier indicating an API specification for the API;
retrieve the API specification based at least in part on the identifier;
parse, in memory of the server, the API specification to determine a parsed model for the API specification;
receive, from the user device, a request message indicating a mock implementation of the API;
generate the mock implementation of the API based at least in part on the parsed model for the API specification;
generate a link to the mock implementation of the API, the link configured to be shared from the user device to an additional user device;
provide the link to the mock implementation of the API to the user device; and
run, in the memory of the server, the mock implementation of the API according to the request message.

16. The apparatus of claim 15, wherein the instructions are further executable by the processor to cause the apparatus to:
identify a source of the API specification based at least in part on the identifier, wherein the API specification is retrieved from the source.

17. The apparatus of claim 16, wherein the instructions are further executable by the processor to cause the apparatus to:
receive, from the user device, an authentication credential; and
provide the authentication credential to the source of the API specification, wherein the API specification is retrieved from the source based at least in part on providing the authentication credential.

18. The apparatus of claim 16, wherein the instructions are further executable by the processor to cause the apparatus to:
authenticate the user device with the source of the API specification based at least in part on the identifier.

19. A non-transitory computer-readable medium storing code for testing an application programming interface (API) at a server, the code comprising instructions executable by a processor to:
receive, from a user device, an identifier indicating an API specification for the API;
retrieve the API specification based at least in part on the identifier;
parse, in memory of the server, the API specification to determine a parsed model for the API specification;
receive, from the user device, a request message indicating a mock implementation of the API;
generate the mock implementation of the API based at least in part on the parsed model for the API specification;
generate a link to the mock implementation of the API, the link configured to be shared from the user device to an additional user device;
provide the link to the mock implementation of the API to the user device; and
run, in the memory of the server, the mock implementation of the API according to the request message.

* * * * *